United States Patent [19]

Vitomir

[11] Patent Number: 5,728,666
[45] Date of Patent: Mar. 17, 1998

US005728666A

[54] WATER-BASED ALCOHOL HYDROXYCARBOXYLIC PEROXIDE COMPOSITIONS AND THEIR PREPARATION

[75] Inventor: Sergio Vitomir, New Westminster, Canada

[73] Assignee: Napier International Technologies, Inc., Surrey, Canada

[21] Appl. No.: 770,093

[22] Filed: Dec. 19, 1996

[51] Int. Cl.$^6$ ............... C11D 3/395; C11D 3/20; C11D 3/39; B08B 3/08

[52] U.S. Cl. ............... 510/203; 510/209; 510/210; 510/211; 510/206; 510/207; 510/421; 510/434; 510/201; 510/375; 134/38

[58] Field of Search ............... 510/209, 210, 510/211, 203, 206, 207, 421, 434, 201, 375; 134/38

[56] References Cited

U.S. PATENT DOCUMENTS

| | | | |
|---|---|---|---|
| 3,355,385 | 11/1967 | Mackley | 252/104 |
| 3,979,219 | 9/1976 | Chang et al. | 106/271 |
| 4,120,810 | 10/1978 | Palmer | 252/153 |
| 4,269,724 | 5/1981 | Hodson | 252/171 |
| 4,683,157 | 7/1987 | Mosser et al. | 428/65 |
| 4,732,695 | 3/1988 | Francisco | 252/162 |
| 4,812,255 | 3/1989 | Suwala | 252/142 |
| 5,015,410 | 5/1991 | Sullivan | 252/166 |
| 5,106,525 | 4/1992 | Sullivan | 252/162 |
| 5,215,675 | 6/1993 | Wilkins et al. | 252/100 |
| 5,319,055 | 6/1994 | Sperry et al. | 528/49 |
| 5,387,363 | 2/1995 | Distaso | 252/163 |
| 5,411,678 | 5/1995 | Sim | 252/548 |
| 5,425,893 | 6/1995 | Stevens | 252/166 |
| 5,427,710 | 6/1995 | Stevens | 252/166 |
| 5,454,985 | 10/1995 | Harbin | 252/558 |
| 5,518,661 | 5/1996 | Langford et al. | 252/364 |
| 5,569,410 | 10/1996 | Distaso | 510/202 |

FOREIGN PATENT DOCUMENTS 2008593  7/1989  Spain .

*Primary Examiner*—Douglas J. McGinty
*Attorney, Agent, or Firm*—Darby & Darby

[57] ABSTRACT

A method for preparing an environmentally safe composition free of chlorinated solvents which is non-flammable, fully biodegradable, and low odor and the use of such composition for the removal of various coatings from metal substrates. The composition comprises a water-based mixture of one or more high boiling, high flash aromatic solvent(s), a peroxide generating agent, and a hydroxycarboxylic acid. It can be prepared as a liquid and used as such for immersion/dipping operations or as a thick paste "cling type" material when optimal application requires a thin film. These can be applied by spraying or brushing.

14 Claims, No Drawings

WATER-BASED ALCOHOL HYDROXYCARBOXYLIC PEROXIDE COMPOSITIONS AND THEIR PREPARATION

BACKGROUND OF THE INVENTION

For decades, strong acids and halocarbon solvent-based compositions were employed in stripping various protective coatings from metal and other substrates. Increased awareness of the detrimental impact of such paint strippers on health and environment, in recent years, resulted in government legislative bodies all over the world restricting and/or prohibiting the use of these materials.

Wilkins et al., U.S. Pat. No. 5,215,675 provides an aqueous stripping composition based on a soluble ester such as ethyl lactate and a peroxide such as hydrogen peroxide.

Distaso, U.S. Pat. No. 5,405,548 and U.S. Pat. No. 5,542,986 describe the use of methylbenzyl formate or benzyl formate and formic acid in an aqueous-based system for stripping various protective coatings.

However, these prior art compositions suffer from several disadvantages, namely, low solvency (low efficacy), high cost, corrosiveness, narrow range of stability, and extremely strong, unpleasant, and irritating odor.

SUMMARY OF THE INVENTION

The present invention is directed to a novel paint stripping composition for effectively removing various protective coatings, particularly epoxy, crosslinked polyurethanes, and alkyd paints, from metal surfaces such as aluminum-based alloys.

The paint stripper comprises three basic components, namely, a solvent system based on one or more high boiling, high flash, aromatic alcohols with or without an aromatic ether, a hydroxycarboxylic acid, and a peroxide generator, in deionized or distilled water.

Broadly, from 5 to 50 parts by wt., preferably from 25 to 35 parts by wt., of the solvent system, from 3 to 20 parts by wt., preferably from 3.5 to 7 parts by wt., of the hydroxycarboxylic acid, and from 3 to 30 parts by wt., preferably from 5 to 10 parts by wt., of the peroxide generator are present in the finished formulation. From 15 to 60 parts by wt., preferably from 40 to 50 parts by wt., of the paint stripper is deionized or distilled water. Other additives such as solubilizers, surfactants, coupling agents, rheology modifiers, corrosion inhibitors, stabilizers, and evaporation retardants are used for specific applications.

In the subject application, parts by wt. and wt. % refer to parts by weight or weight percent of the active constituent. For example, if a 50% aqueous hydrogen peroxide is used and it is desired to have 10 parts by weight of hydrogen peroxide in the final composition, 20 parts by weight of the aqueous hydrogen peroxide must be used.

The present invention provides an effective stripping composition which is free of chlorinated solvents, environmentally safe and user-friendly. It is non-corrosive or only slightly corrosive to the substrate, non-flammable, non-toxic, low odor, and fully biodegradable. The invention also provides the materials, process, and technique for manufacturing liquid or paste (cling) type formulations for stripping non-horizontal coated substrates, applied by spraying or brushing.

DETAILED DESCRIPTION OF THE INVENTION

The paint stripper compositions of the present invention are preferably prepared by admixing, as described below, (1) a polar phase comprising the hydroxycarboxylic acid, peroxide generator, deionized or distilled water, and selected additives with (2) a non-polar phase comprising the organic solvent system. To prepare a liquid paint stripper, the non-polar phase is slowly transferred into the polar phase with continuous mixing so as to form a stable microemulsion. Where a paste-type paint stripper is desired, the polar phase is slowly dispersed into the non-polar phase.

The polar phase is prepared by adding, with continuous mixing, from 3 to 20 parts by wt. of hydroxycarboxylic acid, from 5 to 30 parts by wt. of a peroxide generator, and from 15 to 60 parts by wt. of deionized or distilled water.

Typically, the non-polar phase consists of from 5 to 50 parts by wt. of the formulation, preferably from 25 to 35 parts by wt. Benzyl alcohol, mixtures of benzyl alcohol and benzyl ether, phenoxy propanol, mixtures of phenoxy propanol and benzyl ether, phenoxy ethanol, and mixtures of phenoxy ethanol and benzyl ether are suitable. Preferably, the weight ratio of the aromatic alcohol to ether is 2.5:1.

To form a liquid stripping formulation, with continuous mixing, the non-polar phase is slowly transferred into the polar phase until a clear, stable microemulsion type composition forms.

To achieve a paste (cling) type stripping composition, the polar phase is slowly transferred into the non-polar phase by means of a controlled dispersing operation.

The hydroxycarboxylic acid is described by the following general formula:

$$HOOC-(CH_2)_n-(CH_2)_m-OH \qquad \text{Formula I}$$

where n and m are integers from 0 to 3 and the sum of n and m is at least 1; preferably the sum of n and m is equal to 1. A preferred hydroxycarboxylic acid is glycolic acid (hydroxyacetic acid) but others described by the above formula, such as hydroxypropionic acid, can also be employed. Typically, glycolic acid should be used at from 3 to 20 parts by wt., preferably between 3.5 and 7 parts by wt.

The peroxide generating agent is preferably hydrogen peroxide. On most metal surfaces, including aluminum and its alloys, a decomposition reaction of hydrogen peroxide takes place, generating an intermediate nascent oxygen which associates instantaneously, producing gaseous oxygen and water. The oxygen accelerates the stripping process by initiating the lifting of the softened protective coating and allowing new quantities of the paint stripping composition to penetrate the metal-coating interface. Though hydrogen peroxide is commercially available at concentrations up to 70 wt. %, the use of 30-35% concentration is preferred. This can be achieved by diluting the higher concentration grades of hydrogen peroxide with deionized water.

The presence of deionized water in the polar phase enhances the overall stripping effectiveness of the final stripping formulation. When the protective coating is polar, e.g., polyurethanes, the presence of a solvent with a high dielectric constant such as water ($\epsilon=80.2$@20° C.) has a positive effect in separating charged areas, thus allowing other solvents in the formulation to soften the film.

It is best that the deionized water contain no more than about 1 wt. % of dissolved inorganic salts, preferably less than about 200 ppm. Distilled or deionized water having an electrical conductivity less than about 400 mho/cm is particularly preferred. Failure to follow the above specified water parameters results in peroxide decomposition, thereby retarding the stripping performance.

Other additives may be incorporated in the finished composition, such as: coupling agents (alkylene glycols, DMSO); stabilizers (acetanilide); chelating agents (phosphonic acids, citric acid, EDTA); corrosion inhibitors (benzotriazoles, borates); and rheology modifying agents (hydroxypropyl cellulose, hydroxyethyl cellulose, various gums, fumed or precipitated silica). These additives are well known in the art. Generally, they are present in an amount of from 0.1 to 5.0 wt. %, preferably from 0.2 to 3.0 wt. %.

Also useful are evaporation retardants, such as a silicone fluid (polysiloxanes), water-based wax emulsion, or paraffin oil. Typically from 0.1 to 3.0 parts by wt., preferably 0.2 to 2.5 parts by wt., in the final composition, are used. A solubilizer-emulsifier, such as polyethoxylated sorbitan esters, particularly polyethoxylated sorbitan monolaurate, monopalmitate, monostearate, tristearate, monooleate, or trioleate polysorbates also may be added. Typically, between 0.5 and 5.0 parts by wt. are employed. From about 0.4 to 1.0 part by wt. based on the final composition of the rheology modifying agent is used.

The non-polar phase contains one or more alcohols of formulas II and III, optionally with an ether of formula IV:

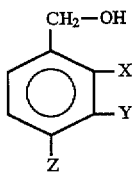 Formula II

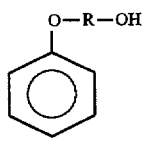 Formula III

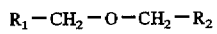 Formula IV where X, Y, and Z are all hydrogen or two hydrogens and a methyl. R may be ethyl, propyl, or isopropyl; and $R_1$ and $R_2$ are hydrogen and benzyl or both benzyl.

To more fully describe the invention, attention is directed to the following examples:

A stainless steel tank and an industrial disperser capable of operating at speeds up to 2000 rpm may conventionally be used in the manufacturing process. All the interior metal surfaces are initially treated (passivated) by contact with nitric acid (40% conc.) for 2 to 3 hours and the non-polar mixture, comprised of the alcohol or alcohol mixtures, is pumped into the stainless steel tank.

As the evaporation retardant, silicone fluid is slowly dispersed into the non-polar phase by mixing at 300 to 400 rpm for 30 to 45 minutes. To the resulting mixture, a solubilizer-emulsifier, a rheology modifying agent, and a corrosion inhibitor are then added. The solubilizer-emulsifier is polyethoxylated sorbitan monooleate. The rheology modifying agent is hydroxypropyl cellulose. The corrosion inhibitor is benzotriazole.

The above system is slowly dispersed for an additional 15 to 30 minutes. The polar phase comprising a hydroxycarboxylic acid, a peroxide generator, and distilled or deionized water is prepared separately and is slowly transferred into the dispersing tank. The hydroxycarboxylic acid is glycolic acid. The peroxide generator is hydrogen peroxide. A considerable increase in the viscosity of the composition takes place. In the next stage, the disperser speed is increased to 1000 to 1200 rpm at which point all the solids present will homogeneously emulsify and stabilize to produce a paste-type composition, as more specifically defined in Table A.

When a liquid composition is prepared, the non-polar phase is slowly transferred, with continuous mixing, into the polar phase. The compositions of the polar and non-polar phases are as described above. Propylene glycol (a coupling agent) and benzotriazole (a corrosion inhibitor) are then added. Table A sets forth a series of paste compositions.

TABLE A

| | (Parts by Wt.) | | | | | | | |
|---|---|---|---|---|---|---|---|---|
| Ingredient | P-1 | P-2 | P-3 | P-4 | P-5 | P-6 | P-7 | P-8 |
| Benzyl alcohol | 35.0 | 20.0 | — | — | 35.0 | — | 35.0 | — |
| Benzyl ether | — | 15.0 | — | 15.0 | — | — | — | — |
| 1-Phenoxy-2-propanol | — | — | 35.0 | 20.0 | — | 35.0 | — | 35.0 |
| Glycolic acid | 10.0 | 10.0 | 10.0 | 10.0 | 10.0 | 10.0 | — | — |
| Hydrogen peroxide (50 wt. %) | 9.0 | 9.0 | 9.0 | 9.0 | — | — | 9.0 | 9.0 |
| Polysorbate ester | 1.4 | 1.4 | 1.4 | 1.4 | 1.4 | 1.4 | 1.4 | 1.4 |
| Hydroxypropyl cellulose | 0.4 | 0.4 | 0.4 | 0.4 | 0.4 | 0.4 | 0.4 | 0.4 |
| 2-Mercapto-benzothiazole | 0.2 | 0.2 | 0.2 | 0.2 | 0.2 | 0.2 | 0.2 | 0.2 |
| Silicone fluid | 0.3 | 0.3 | 0.3 | 0.3 | 0.3 | 0.3 | 0.3 | 0.3 |
| Propylene glycol | — | — | — | — | — | — | — | — |
| Acetanilide | 0.03 | 0.03 | 0.03 | 0.03 | 0.03 | 0.03 | 0.03 | 0.03 |
| Deionized water | 43.67 | 43.67 | 43.67 | 43.67 | 52.67 | 52.67 | 53.67 | 53.67 |

Table B sets forth a series of liquid-type compositions.

TABLE B

| | (Parts by Wt.) | | | | | | | |
|---|---|---|---|---|---|---|---|---|
| Ingredient | L-1 | L-2 | L-3 | L-4 | L-5 | L-6 | L-7 | L-8 |
| Benzyl alcohol | 35.0 | 20.0 | — | — | 35.0 | — | 35.0 | — |
| Benzyl ether | — | 15.0 | — | 15.0 | — | — | — | — |
| 1-Phenoxy-2-propanol | — | — | 35.0 | 20.0 | — | 35.0 | — | 35.0 |
| Glycolic acid | 10.0 | 10.0 | 10.0 | 10.0 | 10.0 | 10.0 | — | — |
| Hydrogen peroxide (50 wt. %) | 9.0 | 9.0 | 9.0 | 9.0 | — | — | 9.0 | 9.0 |
| Polysorbate ester | — | — | — | — | — | — | — | — |
| Hydroxypropyl cellulose | — | — | — | — | — | — | — | — |
| 2-Mercapto-benzothiazole | 0.2 | 0.2 | 0.2 | 0.2 | 0.2 | 0.2 | 0.2 | 0.2 |
| Silicone fluid | — | — | — | — | — | — | — | — |
| Propylene glycol | 4.0 | 15.0 | 4.0 | 15.0 | 4.0 | 4.0 | 4.0 | 4.0 |
| Acetanilide | 0.03 | 0.03 | 0.03 | 0.03 | 0.03 | 0.03 | 0.03 | 0.03 |
| Deionized water | 41.77 | 30.77 | 41.77 | 30.77 | 50.77 | 50.77 | 51.77 | 51.77 |

Sixteen identical aluminum alloy panels (5.5×8.5 in.) coated with a yellow epoxy-type primer and a gray linear polyurethane topcoat, of the type used on commercial and recreational aircraft, were tested. At room temperature (20° C.), eight of the sixteen panels were coated with a thin film of the paste-type compositions and the remaining eight panels were immersed into liquid compositions. The effectiveness of the compositions was evaluated as a percent of removed coating as a function of time, and the results tabulated as shown in Table C:

TABLE C

| Composition | % Removed Coating | Time (min) | Observations |
|---|---|---|---|
| P-1 | 100 | 45 | |
| P-2 | 100 | 60 | |
| P-3 | 100 | 55 | |
| P-4 | 100 | 80 | |
| P-5 | 80 | 90 | No $H_2O_2$ |
| P-6 | 80 | 240 | No $H_2O_2$ |
| P-7 | 95 | 120 | No Glycolic Acid |
| P-8 | 90 | 270 | No Glycolic Acid |
| L-1 | 100 | 25 | |
| L-2 | 100 | 30 | |
| L-3 | 100 | 35 | |
| L-4 | 100 | 30 | |
| L-5 | 90 | 120 | No $H_2O_2$ |
| L-6 | 90 | 130 | No $H_2O_2$ |
| L-7 | 90 | 45 | No Glycolic Acid |
| L-8 | 90 | 60 | No Glycolic Acid |

The above data clearly show that both the paste and liquid formulations of the invention (Compositions P—1 to P—4 and L—1 to L—4) are superior in both stripping rate and completeness of removal to the comparative examples which do not have both the glycolic acid and the hydrogen peroxide (P—5 to P—8 and L—5 to L—8).

What is claimed is:

1. An aqueous paint stripping formulation which comprises:

(a) from 5 to 50 parts by wt. of an aromatic alcohol having the formula II or III, optionally with an aromatic ether having the formula IV, and mixtures thereof

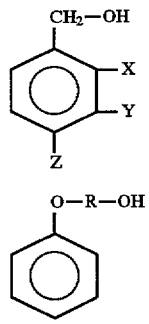 Formula II

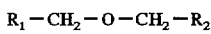 Formula III

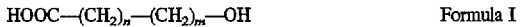 Formula IV where X, Y, and Z are all hydrogen or two hydrogens and a methyl, R may be ethyl, propyl, or isopropyl, and $R_1$ and $R_2$ are hydrogen and benzyl or both benzyl;

(b) from 5 to 30 parts by wt. of hydrogen peroxide;

(c) from 3 to 20 parts by wt. of a hydroxycarboxylic acid having the formula I,

HOOC—$(CH_2)_n$—$(CH_2)_m$—OH   Formula I where n and m are integers from the sum of n and m is equal to 1; and (d) from 15 to 60 parts by wt. of deionized or distilled water.

2. The formulation of claim 1 wherein the aromatic alcohol is benzyl alcohol or methylbenzyl alcohol.

3. The formulation of claim 1 wherein the aromatic alcohol is 1-phenoxy-2-propanol.

4. The formulation of claim 1 wherein the aromatic ether is benzyl ether.

5. A process for preparing a paste-type paint stripper which comprises: dispersing a polar phase containing from 3 to 20 parts by wt. of glycolic acid, from 5 to 30 parts by wt. of hydrogen peroxide, and from 15 to 60 parts by wt. of deionized or distilled water in a non-polar phase containing from 5 to 50 parts by wt. of benzyl alcohol to form a final composition, said final composition also containing from 0.5 to 5.0 parts by wt. of polyethoxylated sorbitan ester(s), from 0.4 to 1.0 part by wt. of hydroxypropyl cellulose, and from 0.1 to 3.0 parts by wt. of silicone fluid, paraffin oil, or emulsified wax.

6. The formulation of claim 1 wherein the hydroxycarboxylic acid is glycolic acid.

7. A stripping formulation comprising mixing a mixture of (a) from 5 to 50 parts by wt. of benzyl alcohol, (b) from 5 to 30 parts by wt. of hydrogen peroxide, (c) from 3 to 20 parts by wt. of glycolic acid, and (d) from 15 to 60 parts by wt. of deionized or distilled water.

8. A paste-type stripping formulation having the composition of claim 7 containing from 0.5 to 5 parts by wt. of a polyethoxylated sorbitan ester or mixture thereof as a solubilizer-emulsifier.

9. The formulation of claim 1 also comprising from 0.4 to 1 part by wt. of a rheology modifying agent selected from the group consisting of hydroxypropyl cellulose, hydroxypropyl methyl cellulose, precipitated silica, and a mixture thereof.

10. The formulation of claim 1 containing from 0.1 to 3.0 parts by wt. of silicone fluid, paraffin oil, or a water-based wax emulsion as an evaporation retardant.

11. The formulation of claim 1 also comprising from 0.1 to 0.5 part by wt. of 2-mercaptobenzothiazole, toluoltriazole, benzotriazole, or 2 (3H)-benzothiazoleethione as a corrosion inhibitor.

12. The formulation of claim 1 also comprising from 0.1 to 1.0 part by wt. of bis(hexamethylene)triamino-penta-(methylene-phosphonic) acid, citric acid, or EDTA as a chelating agent.

13. The formulation of claim 1 also comprising from 0.1 to 1.0 part by wt. of benzotriazole as a corrosion inhibitor and from 0.1 to 1.0 part by wt. of bis(hexamethylene) triamino-penta (methylene-phosphonic) acid as a chelating agent.

14. A process for preparing a paste-type paint stripper composition which comprises dispersing a first mixture containing from 5 to 50 parts by wt. of benzyl alcohol into a second mixture containing from 5 to 30 parts by wt. of hydrogen peroxide, from 3 to 20 parts by wt. of glycolic acid, and from 15 to 60 parts by wt. of deionized or distilled water, said dispersion also containing from 0.5 to 5.0 parts by wt. of polyethoxylated sorbitan ester(s), from 0.4 to 1.0 part by wt. of hydroxypropyl cellulose, and from 0.1 to 3.0 parts by wt. of silicone fluid, paraffin oil, or emulsified wax (solids).

* * * * *